Dec. 1, 1942.   B. R. BENJAMIN ET AL   2,303,320
POWER ADJUSTED IMPLEMENT
Filed Nov. 9, 1940   3 Sheets-Sheet 3
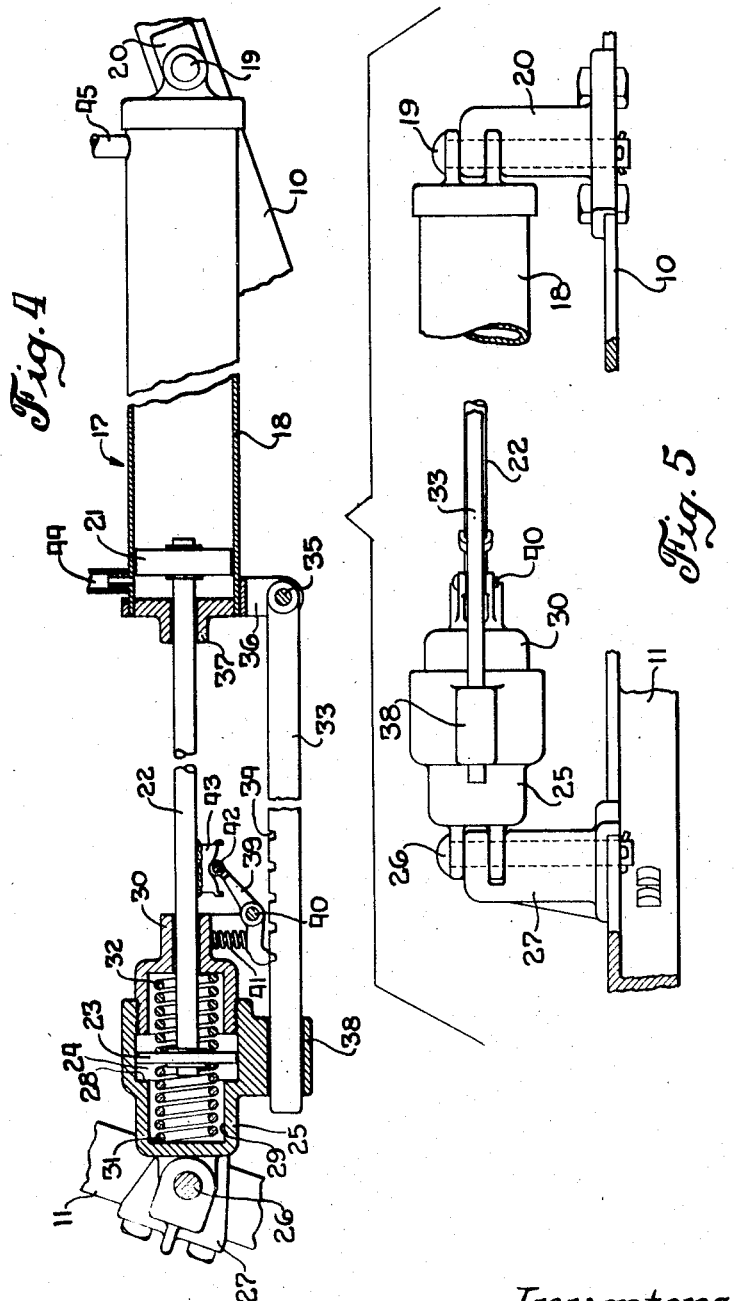
Inventors
Bert R. Benjamin
Russel D. Acton
By Paul O. Pippel
Att'y.

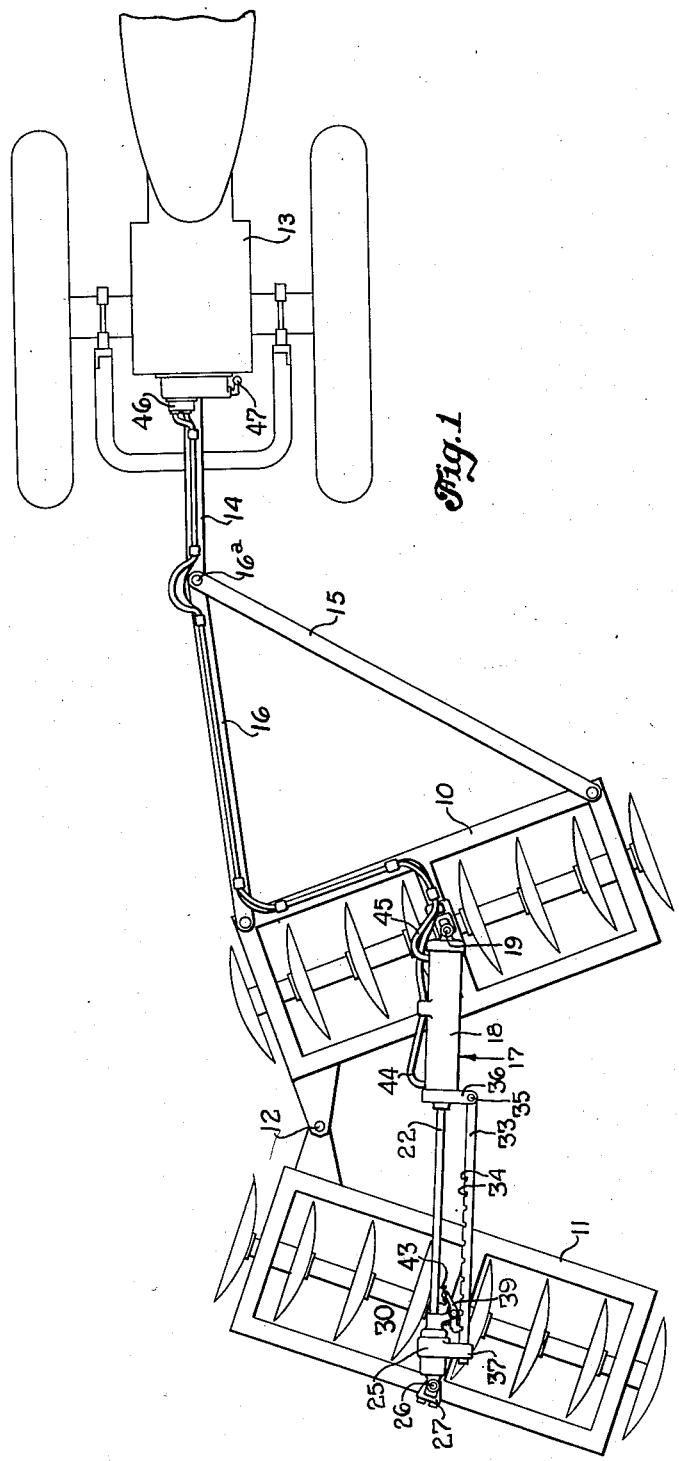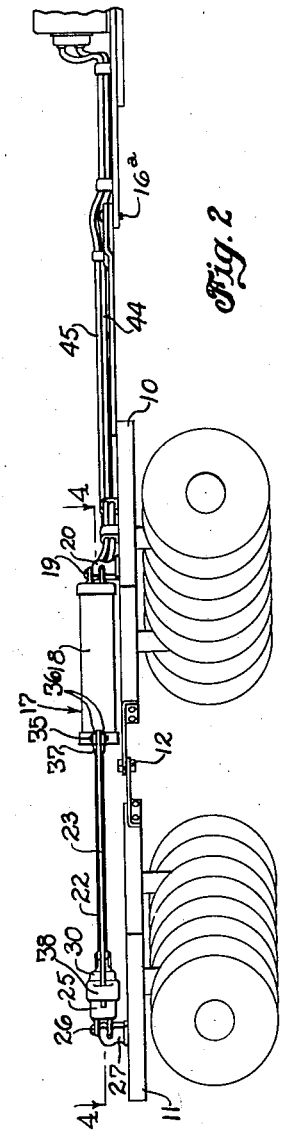

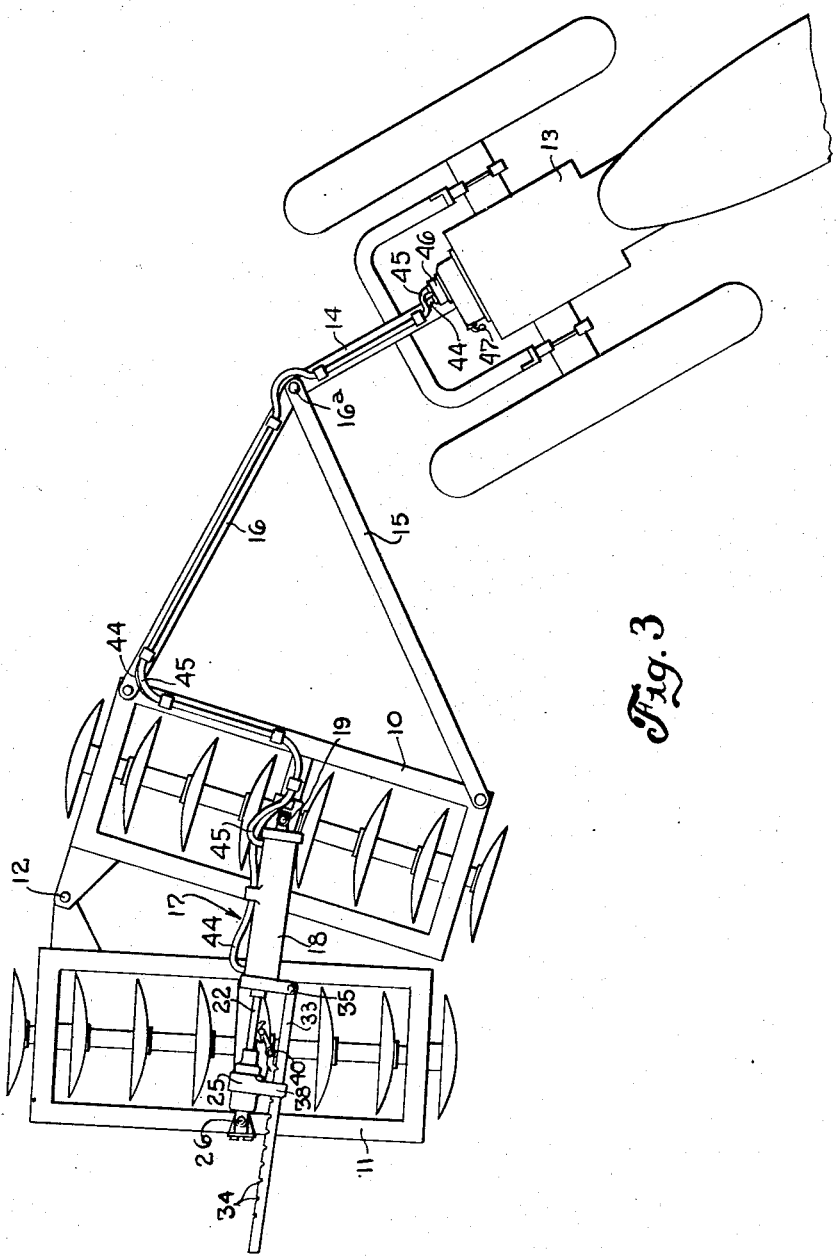

Patented Dec. 1, 1942

2,303,320

UNITED STATES PATENT OFFICE 2,303,320

POWER ADJUSTED IMPLEMENT

Bert R. Benjamin, Oak Park, and Russel D. Acton, Chicago, Ill., assignors to International Harvester Company, a corporation of New Jersey Application November 9, 1940, Serial No. 364,952

21 Claims. (Cl. 55—83)

This invention relates to power adjusting means. More specifically it relates to the adjustment of harrow gangs by power.

It is well known to adjust the gangs of a harrow by means of hand or of draft. Power means for the same purpose are less well known, and the present invention is concerned with a special type of power means for adjusting harrow gangs.

An object of the present invention is to provide an improved power adjusting means.

Another object is the provision of means for adjusting an implement by power.

A further object is to provide means for adjusting the gangs of a harrow by power.

Still another object is the interconnection of power means for adjusting an implement and locking means for the implement in such a way that application of power to the power means automatically releases the locking means.

A still further object is the provision of a power device on a harrow for angling the gangs thereof, the device being actuated by power of the tractor pulling the harrow.

Another object is to provide means for angling a harrow by tractor power and for automatically unlocking the parts of the harrow to permit angling upon the application of power.

According to the present invention, a fluid power device is mounted on a tandem harrow. The cylinder of the device is connected to one gang, and the piston to the other gang. The connection of the piston with the said other gang is such that the application of fluid under pressure by the tractor to the fluid power device effects an automatic release of the locking means holding the harrow gangs against relative movement.

In the drawings:

Figure 1 is a plan view of a tandem harrow in normal operating position with the power means of the present invention applied thereto;

Figure 2 is a side view of the construction shown in Figure 1;

Figure 3 is a plan view of the harrow with the gangs in position for a turn to the right;

Figure 4 is a sectional view taken along the line 4—4 of Figure 2; and,

Figure 5 is a view similar to Figure 2, showing the power means in detail.

The drawings show a harrow composed of a front gang 10 and a rear gang 11 pivotally connected as at 12 for relative angling movement. The harrow is connected to a tractor 13 by means of a draw-bar 14, which may swing with respect to the tractor, and a pair of hitch members 15 and 16 which form with the front side of the front gang a triangular framework, which is pivotally connected as at 16a to the draw-bar 14.

A fluid power device 17 is mounted on the harrow and is composed essentially of a cylinder 18, pivotally connected by a bolt 19 to a standard 20 on the front gang 10, and a piston 21 slidably mounted in the cylinder 18 and connected to the rear gang 11. As seen in Figure 4, a rod 22 extends from the piston 21 and carries an enlargement 23 at its end. The enlargement 23 is slidably mounted in an enlarged bore 24 formed in a cup-shaped member 25 pivotally connected by a bolt 26 to a standard 27 secured to the rear gang 11. Movement of the enlargement 23 is limited in one direction by a shoulder 28 joining the enlarged bore 24 and a reduced bore 29. Movement in the other direction is limited by the end of a tubular member 30 in threaded engagement with the cup-shaped member 25. Springs 31 and 32 acting against the enlargement 23 and the members 25 and 30 urge the enlargement into the central position shown in Figure 4.

A bar 33 having notches 34 is pivotally secured at one end as at 35 to a depending portion 36 of a member 37 secured to one end of the cylinder 18, and is slidably supported at the other end in a depending portion 38 of the member 25. One end of a latch member 39, pivotally supported as at 40, engages any one of the notches 34 in the bar 33 under the action of a spring 41. The other end of the latch member carries a roller 42 engaging a cam 43 secured to the rod 22.

With the latch member 39 engaging the bar 33, the gangs 10 and 11 are held against relative movement, since the cylinder 18, the bar 33, the latch member 39, and the members 25 and 30 constitute a rigid connection between the gangs. Thus during normal operation the gangs are locked in the relative position of Figure 1.

Angling of the gangs is effected by fluid under pressure supplied to the cylinder through either a hose 44 or a hose 45 extending along the front gang 10, thence along the hitch member 16, and finally along the draw-bar 14 to a pump 46 carried at the rear of the tractor 13 and driven thereby. A control member 47 determines the hose through which fluid under pressure is to be supplied. The hoses 44 and 45 are appropriately secured at various points to the parts along which they extend.

In the position of Figure 1 the gangs open to the right at the widest possible angle, the piston 21 being at the left end of the cylinder 18 as viewed in Figure 4. When it is desired to shift the gangs to the position of Figure 3 in which a turn to the right may be made, fluid under pressure is admitted through the hose 44 to the left side of the piston 21 to move it to the right. The piston moving to the right moves the rod 22 and enlargement 23 to the right against the spring 32, the members 25 and 30 remaining stationary for the movement. Consequently, there is relative movement between the latch member 39 and the cam 43 such as to lift the latch out of a notch 34 in the bar 33. Thus the gangs are released from a locked position. The enlargement 23 on the rod 22 finally abuts the end of the tubular member 30, and further movement of the piston 21 causes movement of the members 25 and 30 and the gang 11. When finally the gangs have reached the position of Figure 3, supplying of fluid under pressure through the hose 4 to the cylinder 18 against the left end of the piston 21 is ceased. With force no longer applied to the piston, the spring 32 urges the enlargement 23 back to its central position in the enlarged bore 24 in the cup-shaped member 25, and the roller 42 on the latch member 39 again engages the central portion of the cam 43 so that the spring 41 again urges the latch member 49 into a notch 34 in the bar 33. The gangs are now locked against relative movement in the position of Figure 3, and the turn to the right may be made.

When the turn is completed, fluid under pressure is supplied through the hose 45 to the right side of the piston 21 so as to move the piston to the left. During the initial movement of the enlargement 23 on the rod 22 to the left against the spring 31, there is no movement of the unit comprising members 25 and 30, and consequently there is relative movement between the latch member 39 and the cam 43 such as to lift the latch member out of engagement with a notch 34. The gangs are now unlocked so as to be capable of relative movement, and further movement of the piston 21 to the left, after abutment of the enlargement 23 on the rod 22, causes movement to the left of the cup-shaped member 25 and the rear gang 11. The supplying of fluid under pressure through the hose 45 to the right side of the piston 21 is continued until the gangs have reached the position of Figure 1 or any desired intermediate position between the positions of Figure 3 and Figure 1. With cessation of pressure on the piston 22, the enlargement 23 again moves to the central postion of Figure 4 in the bore 24, and the latch member is again forced into a notch 34 in the bar 33.

It will be seen from the foregoing description that means have been provided for moving the gangs of a harrow either toward or away from one another under the action of fluid under pressure supplied by a tractor connected to the harrow. The gangs are automatically released from a locked position so as to be capable of relative movement merely upon the application of fluid under pressure to the means and are automatically locked against relative movement upon cessation of application of fluid under pressure to the means. It is obvious that relative movement between any two parts of a harrow for adjustment of the harrow may be similarly obtained, and that the adjustment of other implements than harrows may be accomplished in the same manner.

Under the invention, application of force to a harrow or implement for the sake of relative movement between parts in one direction or another automatically releases the parts from being held or locked against relative movement. When application of force ceases, the parts are automatically locked or held against relative movement.

It will be apparent that changes may be made in the form of invention herein particularly disclosed without departure from the spirit of the invention. The intention is to limit the invention only within the scope of the appended claims.

What is claimed is:

1. In combination, a harrow comprising a gang part and another part connected together for relative movement, means for holding the parts against relative movement in any one of a number of positions, means for moving the parts toward or away from one another, said means being connected to the one part so as to be urged into a certain position with respect to the said one part from which position the said means has limited relative movement, and means connecting the holding means and the adjusting means for causing the said limited movement of the adjusting means to cause the holding means to release the parts.

2. The combination specified in claim 1, both of the parts of the harrow being gangs.

3. In combination, a tractor having a power plant, a harrow connected to the tractor and comprising a pair of gangs connected to one another for relative movement, means for holding the gangs against relative movement in any one of a plurality of adjusted positions, adjusting means connecting the harrow gangs for moving the same toward or away from one another, means connecting the tractor power plant and the adjusting means for supplying power to actuate the adjusting means, and means connecting the adjusting means and the holding means for causing application of power to the adjusting means to make the holding means release the harrow gangs for relative movement and cessation of power to the adjusting means to make the holding means again hold the harrow gangs against relative movement.

4. In combination, a tractor having a power plant, a harrow connected to the tractor and composed of a gang and another part connected to one another for relative movement, means for holding the gang and the part against relative movement in any one of a plurality of adjusted positions, adjusting means connecting the gang and the part for moving them toward or away from one another, means connecting the tractor power plant and the adjusting means for supplying power to actuate the adjusting means, and means connecting the adjusting means and the holding means for causing application of power to the adjusting means to make the holding means release the gang and the part from one another and cessation of power to the adjusting means to make the holding means again hold the gang and the part against relative movement.

5. In combination, a tractor having a power plant, an implement connected to the tractor and having two parts adjustable one with respect to the other, means for holding the parts against relative movement in any one of a plurality of adjusted positions, adjusting means for causing relative movement between the parts in a plurality of directions, means connecting the tractor power plant and the adjusting means for supplying power to actuate the adjusting means, and means connecting the adjusting means and the holding means for causing application of power to the adjusting means to make the holding means release the two parts from one another and the cessation of power to the adjusting means to make the holding means again hold the two parts against relative movement.

6. In combination, a harrow comprising a gang part and another part connected to one another for relative movement, means for holding the parts against relative movement in any one of a plurality of adjusted positions, adjusting means for moving the parts toward or away from one another, and means connecting the holding means and the adjusting means for causing application of force in one direction or another to the adjusting means to move the parts toward or away from one another to make the holding means release the parts from one another for relative movement and the cessation of force to the adjusting means to make the holding means again hold the parts against relative movement.

7. The combination specified in claim 6, both of the parts of the harrow being gangs.

8. In combination, a tractor having a power plant, a harrow connected to the tractor and having a gang part and another part connected to one another for relative movement, means for holding the parts against relative movement, a fluid power device mounted on the harrow and comprising a cylinder part connected to one harrow part and a piston part movable within the cylinder part and connected with the other harrow part, means connecting the tractor power plant and the fluid power device for supplying fluid under pressure to the device to cause relative movement between the piston part and the cylinder part in one direction or another, and thereby movement of the harrow parts toward or away from one another, and means connecting the holding means and one part of the fluid power device for causing application of fluid under pressure to the device to make the holding means release the harrow parts for relative movement.

9. The combination specified in claim 8, both of the parts of the harrow being gangs.

10. The combination specified in claim 8, the means connecting the tractor power plant and the fluid power device being capable of moving the parts of the device either in one direction or the other for moving the harrow parts toward or away from one another, and the means connecting the one part of the fluid power device and the holding means causing cessation of application of fluid under pressure to the device to make the holding means again hold the harrow parts against relative movement.

11. The combination specified in claim 8, the means connecting the tractor power plant and the fluid power device being capable of moving the parts of the device either in one direction or the other for moving the harrow parts toward or away from one another, and the means connecting the one part of the fluid power device and the holding means causing cessation of application of fluid under pressure to the device to make the holding means again hold the harrow parts against relative movement, both parts of the harrow being gangs.

12. In combination, a tractor having a power plant, a harrow connected to the tractor and having a gang part and another part connected for relative movement, means holding the parts against relative movement, a fluid power device mounted on the harrow and comprising a cylinder part and a piston part slidable within the cylinder part, means connecting one part of the device and one harrow part, means connecting the other part of the device and the other harrow part so as to urge the said other part of the device into a certain position with respect to said other harrow part from which position the part of the device has limited relative movement, means connecting the tractor power plant and the fluid power device for supplying fluid under pressure to the device to cause relative movement between the parts of the device and thereby relative movement between the harrow parts, and means connecting the holding means and the said other part of the fluid power device to cause the said limited movement of the said other part of the device with respect to the said other harrow part to make the holding means release the harrow parts from one another for relative movement.

13. The combination specified in claim 12, both of the parts of the harrow being gangs.

14. The combination specified in claim 12, the means connecting the said other part of the fluid power device and the said other harrow part urging the said other part of the device into a certain position with respect to the said other harrow part from which the part of the device has relative movement in a plurality of directions, the means connecting the tractor power plant and the fluid power device being capable of moving the parts of the device either in one direction or the other and thereby the harrow parts toward or away from one another, and the means connecting the holding means and the said other part of the fluid power device causing cessation of the application of fluid under pressure to the device to make the holding means again hold the harrow parts against relative movement.

15. The combination specified in claim 12, the means connecting the said other part of the fluid power device and the said other harrow part urging the said other part of the device into a certain position with respect to the said other harrow part from which the part of the device has relative movement in a plurality of directions, the means connecting the tractor power plant and the fluid power device being capable of moving the parts of the device either in one direction or the other and thereby the harrow parts toward or away from one another, and the means connecting the holding means and the said other part of the fluid power device causing cessation of the application of fluid under pressure to the device to make the holding means again hold the harrow parts against relative movement, both parts of the harrow being gangs.

16. A power take-off device for tractors comprising, in combination with a tractor provided with fluid pressure supplying means, a cylinder, a conduit connecting said cylinder to said means, a piston in said cylinder, two members mounted for relative movement, means for connecting the cylinder to one of said members and means for connecting the piston to the other member, locking means between said members, and means carried by the piston operative to unlatch said locking means during initial travel of the piston.

17. A power take-off device for tractors comprising, in combination with a tractor provided with fluid pressure supplying means, a cylinder, conduits connecting the opposite ends of said cylinder to said means, a piston in said cylinder adapted to be driven in either direction, two members mounted for relative movement, means for connecting the cylinder to one of said members and means for connecting the piston to the other member, locking means between said members, and means carried by the piston operative to unlatch said locking means during initial travel of the piston in either direction.

18. A power take-off device for tractors comprising, in combination with a tractor provided with fluid pressure supplying means, a cylinder, a conduit connecting said cylinder to said means, a piston in said cylinder, two members mounted for relative movement, means for connecting the cylinder to one of said members and means for connecting the piston to the other member, one of said connecting means being resiliently yieldable during initial movement of the piston relative to the cylinder, locking means between said members, and means carried by the piston for unlatching said locking means during initial travel thereof.

19. A power-operated adjusting device for tractor attached implements comprising, in combination with a tractor provided with a pump and an implement connected to the tractor, implement adjusting means including two members, a cylinder connected to one of said members, a conduit connecting the cylinder and the pump, a piston in the cylinder connected to the other member, one of said connecting means being resiliently yieldable during initial movement of the piston relating to the cylinder, locking means between said members, and means carried by the piston for unlatching said locking means during initial travel of the piston.

20. In combination, a tractor, an implement connected to the tractor, means for holding the implement against adjustment in any one of a plurality of positions of adjustment, adjusting means for adjusting the implement, and means connecting the holding means and the adjusting means for causing application of force to the adjusting means for adjusting the implement, to make the holding means release the implement for adjustment and the cessation of force to the adjusting means to make the holding means hold the implement against adjustment regardless of its position of adjustment.

21. In combination, a tractor having a power plant, an adjustable implement connected to the tractor, means for holding the implement against adjustment, means for adjusting the implement and including lost-motion means, means connecting the tractor power plant and the adjusting means for causing the adjusting means to adjust the implement, and means connecting the adjusting means and the holding means for causing application of power by the tractor power plant to the adjusting means to release the holding means by virtue of the lost-motion means.

BERT R. BENJAMIN.
RUSSEL D. ACTON.